United States Patent
Stuart et al.

(10) Patent No.: US 9,729,755 B2
(45) Date of Patent: Aug. 8, 2017

(54) INTELLIGENT IMAGE CORRECTION WITH PREVIEW

(75) Inventors: Thomas William Stuart, Northants (GB); Asad Khalid Raja, Bristol (GB); Richard Henry Bay, Essex (GB); Samuel Luke Mills, Somerset (GB)

(73) Assignee: Xerox Corporation, Norwalk, CT (US)

( * ) Notice: Subject to any disclaimer, the term of this patent is extended or adjusted under 35 U.S.C. 154(b) by 354 days.

(21) Appl. No.: 13/221,969

(22) Filed: Aug. 31, 2011

(65) Prior Publication Data

US 2013/0050767 A1 Feb. 28, 2013

(51) Int. Cl.
H04N 1/387 (2006.01)
H04N 1/00 (2006.01)
H04N 1/409 (2006.01)

(52) U.S. Cl.
CPC ....... *H04N 1/3878* (2013.01); *H04N 1/00005* (2013.01); *H04N 1/0005* (2013.01); *H04N 1/00039* (2013.01); *H04N 1/0044* (2013.01); *H04N 1/00063* (2013.01); *H04N 1/00076* (2013.01); *H04N 1/00082* (2013.01); *H04N 1/4097* (2013.01); *H04N 2201/0094* (2013.01); *H04N 2201/0098* (2013.01)

(58) Field of Classification Search
CPC ........... G01N 21/3563; G01N 21/8851; H04N 1/00795; H04N 1/38
See application file for complete search history.

(56) References Cited

U.S. PATENT DOCUMENTS

| 3,930,231 | A | * | 12/1975 | Henrichon, Jr. | G06K 9/32 382/205 |
|---|---|---|---|---|---|
| 5,377,279 | A | * | 12/1994 | Hanafusa et al. | 382/141 |
| 6,078,051 | A | * | 6/2000 | Banton et al. | 250/341.1 |
| 7,277,589 | B2 | * | 10/2007 | Enomoto | 382/254 |
| 7,433,083 | B2 | * | 10/2008 | Hagai | H04N 1/4051 358/3.06 |
| 2003/0072501 | A1 | * | 4/2003 | Enomoto | H04N 1/4097 382/311 |
| 2004/0100622 | A1 | * | 5/2004 | Kaltenbach | B41J 11/009 355/40 |
| 2005/0271296 | A1 | * | 12/2005 | Tsuji | G06K 9/3283 382/275 |
| 2007/0188815 | A1 | * | 8/2007 | Donovan et al. | 358/3.26 |
| 2011/0164292 | A1 | * | 7/2011 | Wolf | G06F 1/1626 358/473 |

* cited by examiner

*Primary Examiner* — Nicholas Pachol
*Assistant Examiner* — Frantz Bataille
(74) *Attorney, Agent, or Firm* — Fay Sharpe LLP

(57) ABSTRACT

As set forth herein, methods and systems for automated image defect detection. An input image is subjected to skew detection and contaminant detection. Upon detection of skew of and/or contaminants in the image data, correction data, including indicia of the contaminants/skew, correction angles and directions are calculated and displayed on an electronic representation of the document. Automatic correction may then be performed to correct the detected defects, allow the defects to remain, or re-scan the original document to generate new image data without the detected defects.

19 Claims, 11 Drawing Sheets

INTELLIGENT IMAGE CORRECTION WITH PREVIEW

TECHNICAL FIELD

The presently disclosed embodiments are directed toward methods and systems for printing, reproducing or displaying images. More particularly, the teachings disclosed herein are applicable to methods and systems wherein automatic defect detection and correction are implemented.

BACKGROUND

A multifunction device is generally capable of performing a variety of services, including printing, scanning, copying, facsimile, storage, electronic mailing, and the like. The user interfaces associated with such devices include alphanumeric keyboards, touch screen displays, color displays, biometric interfaces, and the like. When running an operation that involves the generation of electronic image data, e.g. copying, scanning, electronic mail, facsimile, the resulting image data is capable of including one or more defects compared to the original document, file, or transmission. For example, a scanned image may be defective either by not being scanned straight, commonly referenced as "skew", or by contamination of an image.

Current implementations provide feedback, i.e., a visual display, to the user only upon review of a hard copy (copying operation) or by returning to the user's computer to view the document. Only upon the examination of the hard copy, would the user become aware of the errors or defects in the scanned image data. Correction would then be manually undertaken and the operation repeated Such occurrences not only affect productivity, but also increase costs associated with output media, e.g., paper, transparencies, etc. Apart from affecting productivity, another inherent issue occurs with the scan to email operation, in that the documents are sent to another user and not necessarily to the user who is scanning the document. Thus, such errors become apparent only to the recipient of the email and not necessarily to the user initiating the operation.

BRIEF DESCRIPTION

In some illustrative embodiments disclosed as illustrative examples herein, a method for automated image defect correction includes receiving, with a processor, input image data that represents a document and analyzing the received input image data so as to detect at least one defect in the input image data. The method further includes generating a representation of the received input image data including the one or more detected defects. Indicia is generated on the representation of the image data corresponding to the at least one detected defect. The method also includes receiving correction data representing a correction of the at least one detected defect, and correcting the at least one detected defect in accordance with the received correction data.

In some illustrative embodiments disclosed as illustrative examples herein, an automated image defect correction system includes a processor, an associated user interface, and memory. The memory, which is in communication with the processor, stores instructions which are executed by the processor for receiving input image data representing a document, and for analyzing received input image data so as to detect one or more defects corresponding to the image data. The instructions are also for generating a representation on the associated user interface of the received image data that includes at least one detected defect, and for generating indicia on the representation of the image data corresponding to the at least one detected defect. In addition, the instructions are for receiving correction data representative of a correction of the at least one detected defect, and for correcting the at least one detected defect in accordance with the received correction data. The memory further stores instructions for outputting, via the associated user interface, corrected image data representative of a corrected document.

In some illustrative embodiments disclosed as illustrative examples herein, a computer-implemented method for automatically correcting image defects in scanned documents includes with a processor, receiving image data corresponding to an electronic copy of a scanned document into a memory associated with the processor, and analyzing the received image data in the memory for at least one defect contained therein. The method further includes detecting at least one defect in the image data corresponding to at least one of a skew, a contamination, a banding, a lead edge, and an alignment defect, and generating a notification indicative of the occurrence of the detected at least one defect. In addition, the computer-implemented method includes generating a representation of the received image data inclusive of the detected at least one defect, and generating indicia corresponding to the occurrence and placement of the at least one defect on the received image data representation. The method also includes receiving selection data responsive to the notification corresponding to a selection of at least one of accepting the at least one defect, correcting the at least one defect, and rescanning the document, and receiving correction data corresponding to a correction of the at least one defect in accordance with the selection data responsive. The method further includes generating corrected image data in accordance with received correction data.

BRIEF DESCRIPTION OF THE DRAWINGS

FIG. 5 illustrates a sample binary representation illustrating a properly oriented page without skew in accordance with one embodiment of the subject application.

DETAILED DESCRIPTION

Figure 1:
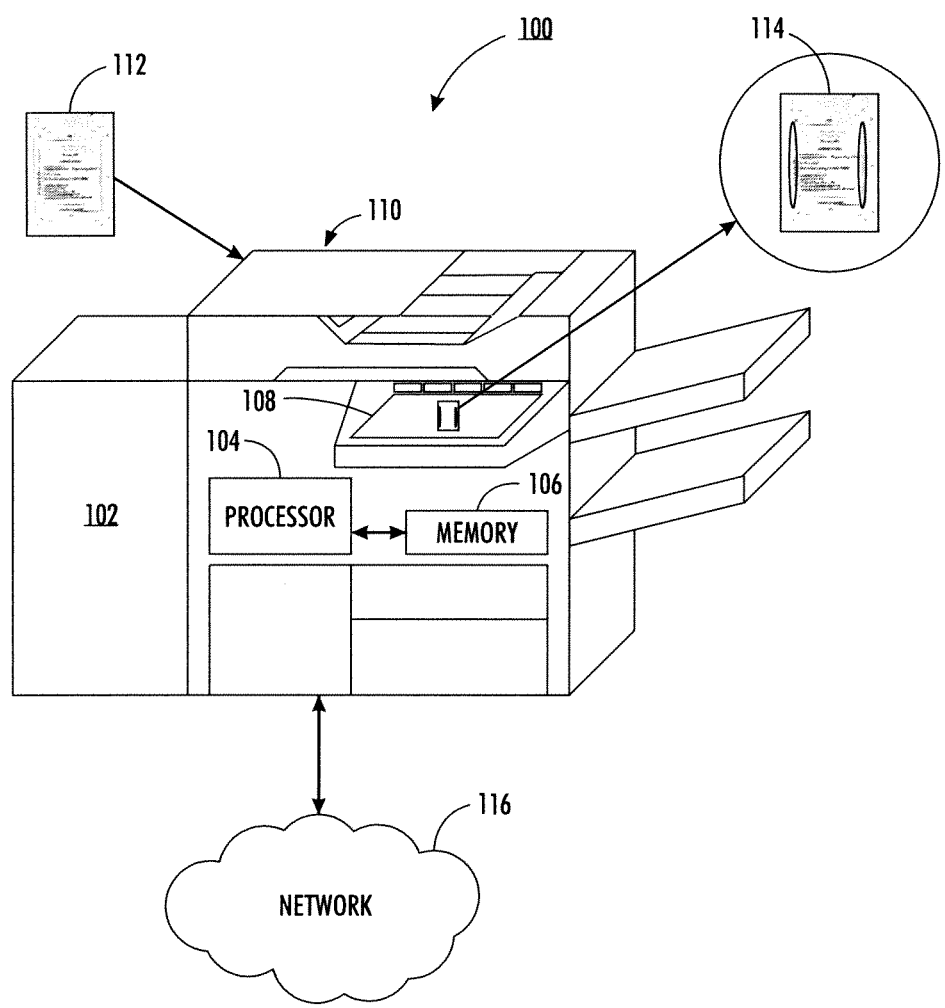
FIG. 1 illustrates a system capable of implementing the systems and methods for defect detection and correction in accordance with one embodiment of the subject application.

One or more implementations of the subject application will now be described with reference to the attached drawings, wherein like reference numerals are used to refer to like elements throughout.

The subject application presents methods and systems for intelligent, automatic correction of image data with a preview of defects of any potential issues with a scanned image and an alert to the user. The user is presented with a preview of the scanned image on the graphical user interface of the display associated with the multifunction device which highlights any potential defects on the scan. If the scanned image does not contain any defects, the image is scanned with no alerts given. If the image scanned contains potential defects, a preview of the image is displayed to the user, on the local interface of the multifunction device, circling the area in which a potential defect is found. The user then confirms that this is expected, removes the defect, or re-scans the image. In addition, the displaying referenced above may include, for example and without limitation, any type of visual, audio or other communication to a human user, at any time, via any device.

Defects include, for example and without limitation, skewing, contamination, image lead edge discrepancies, banding, tilt, alignment, color processing, text recognition, image blurring or saturation, or the like. It will be appreciated that other defects inherent in image generation are also capable of detection and correction in accordance with the embodiments described herein, and the subject application is thus not so limited to the examples set forth above.

Turning now to FIG. 1, there is shown an example system 100 that may be used for automatic defect detection and image correction in accordance with the example embodiments described herein. It will be appreciated that the various components depicted in FIG. 1 are for purposes of illustrating aspects of the subject application, and that other similar components, implemented via hardware, software, or a combination thereof, are capable of being substituted therein. The system 100 includes a multifunction device 102, which is representative of any computing system, which comprises at least a processor 104 (described in greater detail as the processor 1002 of FIG. 10) that executes, and a memory 106 (described in greater detail below as the memory 1004 of FIG. 10) that stores computer-executable instructions for providing the various functions, calculations, selections, and the like, described herein. It will be appreciated that the multifunction device 102, is suitably adapted to perform a variety of document processing operations, including, for example and without limitation, scanning, copying, facsimile transmissions, printing, electronic mail communications, document management, document storage, or the like.

In accordance with one embodiment of the subject application, the multifunction device 102 is capable of being employed as one possible hardware configuration to support the systems and methods described herein. The skilled artisan will further appreciate that although the multifunction device 102 is illustrated as a standalone document processing device, any suitable computing environment is capable of being employed in accordance with the subject application. For example, computing architectures including, but not limited to, multiprocessor, distributed, client/server, tablet, mainframe, supercomputer, digital and analog can be employed in accordance with the one embodiment of the subject application. It will further be appreciated that the multifunction device 102 may include a computer server, workstation, personal computer, combination thereof, or any other computing device.

The multifunction device 102 can include a processing unit 104 (see, e.g. FIG. 10), a system memory 106 (see, e.g. FIG. 10), and a system bus (such as the bus 1012 of FIG. 10) that couples various system components including the system memory 106 to the processing unit 104. The processing unit 104 can be any of various commercially available processors. The processing unit 104 can be variously embodied, such as by a single-core processor, a dual-core processor (or more generally by a multiple-core processor), a digital processor and cooperating math coprocessor, a digital controller, or the like. The processing unit 104, in addition to controlling the operation of the multifunction device 102, executes instructions stored in memory 106 for performing the methods outlined in FIGS. 2, 3, and 4, as described more fully below.

The term "software," as used herein, is intended to encompass any collection or set of instructions executable by a computer or other digital system so as to configure the computer or other digital system to perform the task that is the intent of the software. The term "software" as used herein is also intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The multifunction device 102 typically includes at least some form of computer readable media. Computer readable media can be any available media that can be accessed by the multifunction device 102. For example, and without limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes, for example, and without limitation, BLUETOOTH, WiMax, 802.11a, 802.11b, 802.11g, 802.11(x), a proprietary communications channel, infrared, optical, the public switched telephone network, or any suitable wireless data transmission system, or wired communications known in the art. Combinations of any of the above can also be included within the scope of computer readable media.

A user may enter commands and information into the computer through an input device 108 (see, e.g. FIG. 10) such as a touch-screen interface, a keyboard, a pointing device, such as a mouse, stylus, voice input, or graphical tablet. The multifunction device 102 is capable of operating in a networked environment using logical and/or physical connections to one or more remote computers, such as a remote computer(s), depicted as the network 116 of FIG. 1. The logical connections depicted include a local area network (LAN) and a wide area network (WAN). Such networking environments are commonplace in offices, enterprise-wide computer networks, intranets and the Internet.

As illustrated in FIG. 1, the system 100 also includes a scanning unit 110 (described in greater detail below as the scanning components 1024 and 1032 of FIG. 10). The multifunction device 102, via operation of the scanning unit 110, is capable of receiving or generating an electronic representation of an original document 112. It will be appreciated that in accordance with one embodiment of the subject application, the input image data corresponding to the original document 112 may be received via the computer network 116 from a remote device (not shown), such as, e.g., a desktop computer, a computer workstation, an electronic mail transmission, a facsimile transmission, networked storage, or the like. The multifunction device 102 generates, via the user interface 108, an electronic representation of the original document 112 as image data 114 inclusive of defects and indicia corresponding thereto as explained in greater detail below. Additional functioning of the multifunction device 102 is discussed in greater detail below with respect to the example multifunction device system 1000 of FIG. 10.

Figure 2:
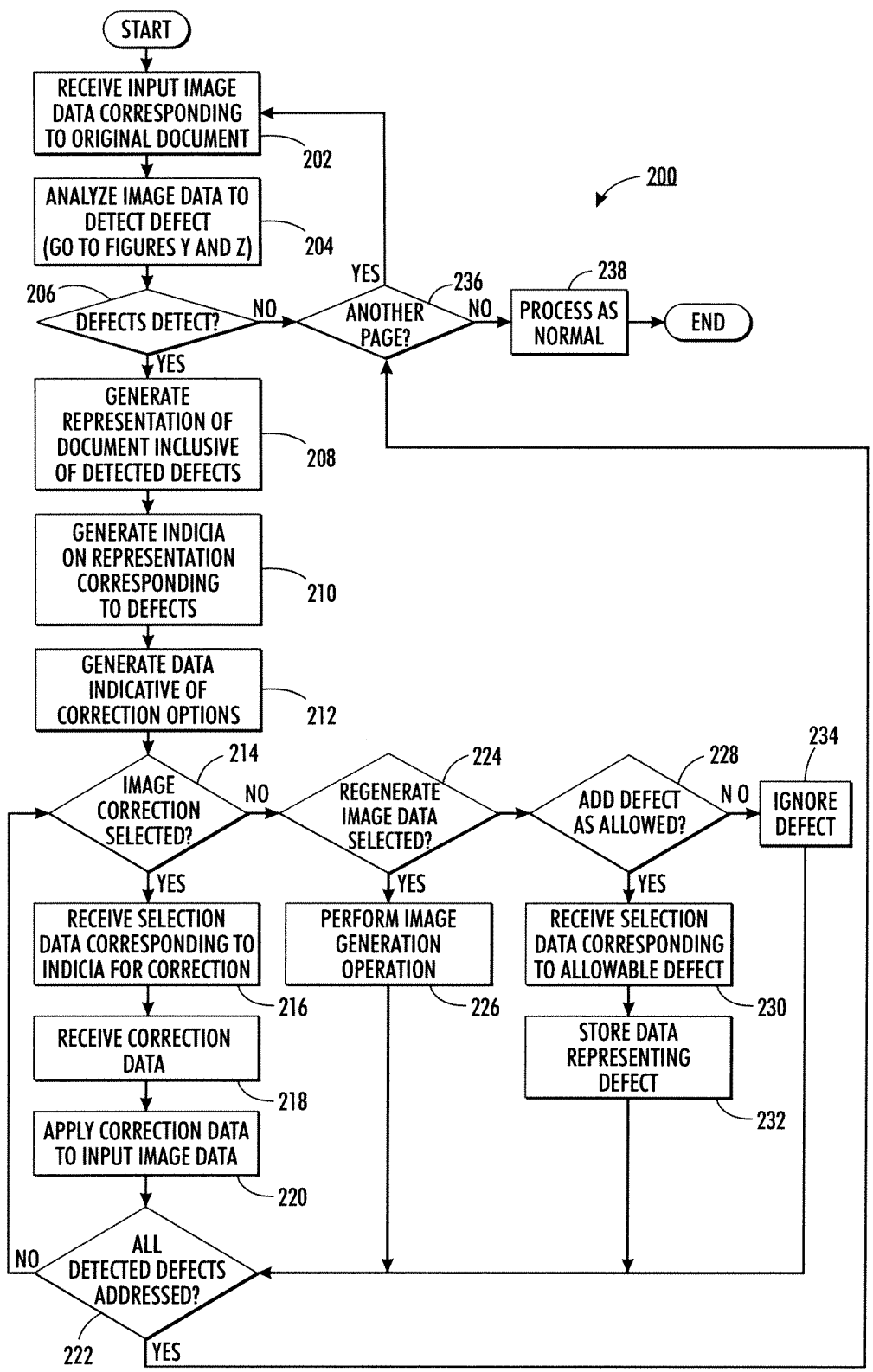
FIG. 2 illustrates an example methodology for defect detection and correction in accordance with one embodiment of the subject application.

Turning now to FIG. 2, there is depicted a flowchart 200 illustrating one example embodiment of the subject application, described hereinafter using the various components of FIG. 1. It will be appreciated that the components of FIG. 1 are used hereinafter for purposes of explaining one implementation of the subject application. Various other components, as will be appreciated, are also capable of being used and implemented to perform the methods described hereinafter.

The methodology of FIG. 2 begins at 202, whereupon input image data 114 corresponding to an electronic representation of an original document 112 is received. It will be appreciated that the image data 114 represent, for example and without limitation, a photograph, word processing document, spreadsheet, graphic, and the like. As used hereinafter with respect to FIGS. 2-9, the image data 114 may refer to a page of the original document 112, the entire document 112, or the like, as will be appreciated by the context in which the terms are used. According to one embodiment of the subject application, the image data 114 is capable of being received via the computer network 116, via a scanning operation of the scanning unit 110 of the multifunction device 102, via a facsimile operation of the multifunction device 102, or the like. The received input image data 114 is then analyzed by the processor 104 associated with the multifunction device 102 so as to detect defects present in the input image data 114 at 204. It will be appreciated that such defects may include, for example and without limitation, skewing of the document, contamination of the document, and the like. According to one embodiment of the subject application, the skewing of a document 112 may result from an offset during image scanning or an error during feeding of the document 112 via an auto-feeder or document handler (not shown), contamination may result from particulate on the document 112 scanned, dark patches representative of the edges of a document 112 (off-center scanning), dirt on glass during scanning, scanner malfunction, or the like.

Figure 3:
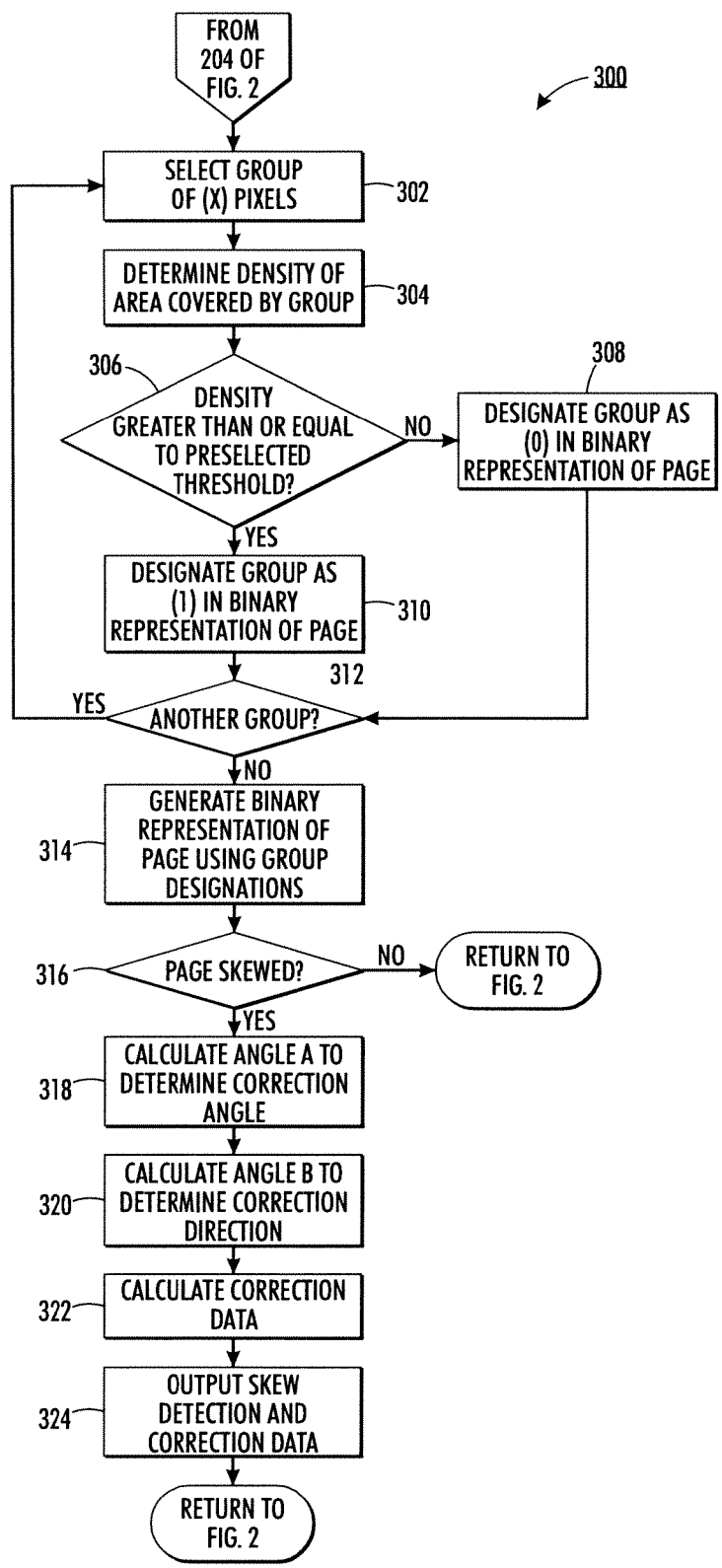
FIG. 3 illustrates an example methodology for skew detection for use in the defect detection and correction of FIG. 2 in accordance with one embodiment of the subject application.
Figure 4:
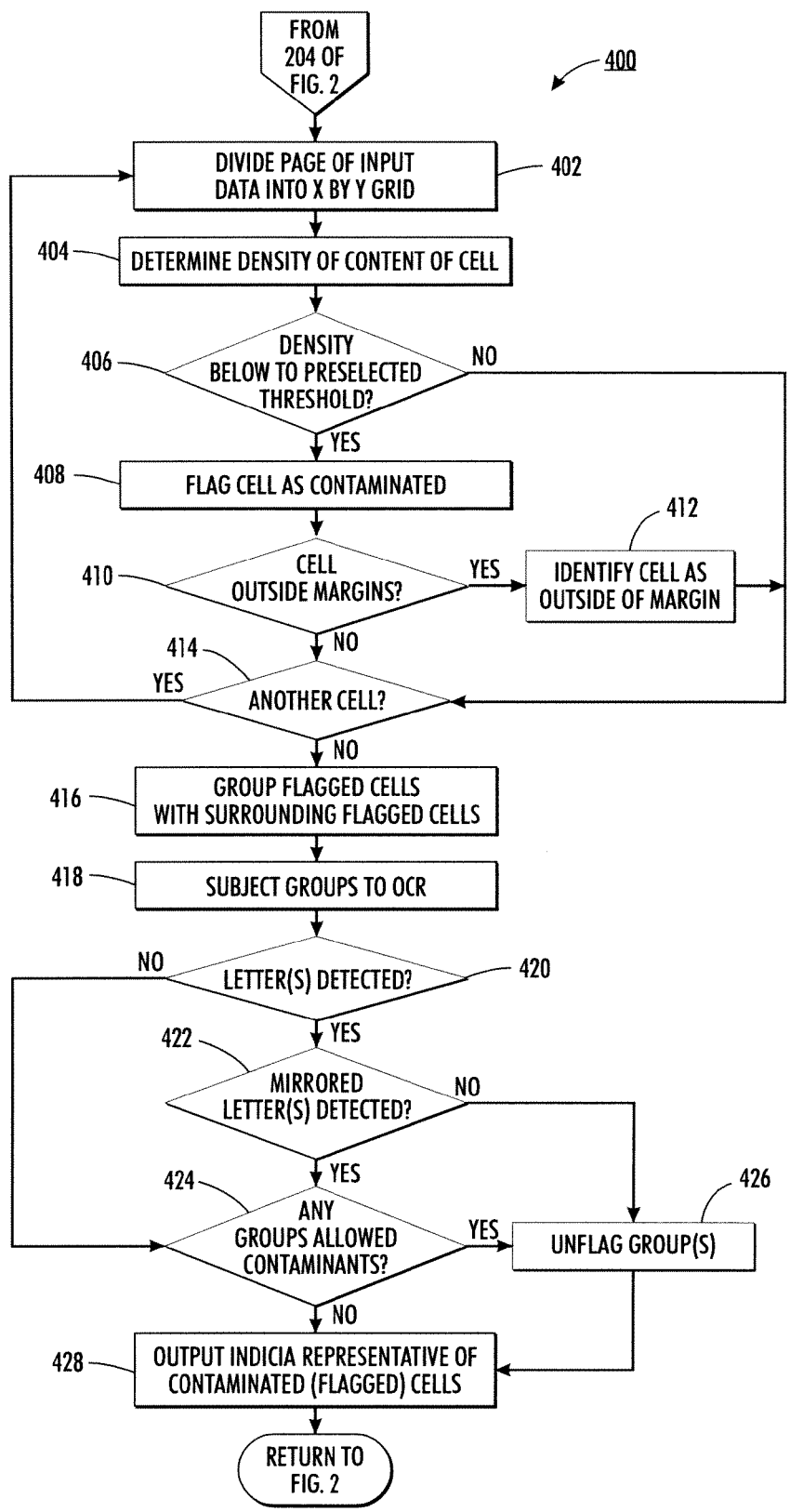
FIG. 4 illustrates an example methodology for banding/contaminant detection for use in the defect detection and correction of FIG. 2 in accordance with one embodiment of the subject application.

In accordance with one example embodiment of the subject application, defect detection is accomplished in accordance with the methodologies set forth in FIGS. 3 and 4, which may be executed in any order (FIG. 3 then FIG. 4, FIG. 4 then FIG. 3), or simultaneously. It will be appreciated that analysis for detection of defects in the input image data 114 may be accomplished via one or more additional methodologies, and the following skewing and contaminant detection methods are not intended to limit the subject application thereto. Turning now to FIG. 3, there is shown one example method 300 for detecting whether an electronic image 114 of a document 112 is skewed according to one embodiment of the subject application. The methodology begins at 302, whereupon a group of (x) pixels is selected from a page of the received input image 112. It will be appreciated that the number of pixels (x) per group is capable of being selected in accordance with user preferences, manufacturer settings, device capabilities, resolution settings, or the like, e.g. groups of 5, 9, 14, 20 . . . pixels. At 304, the density of the selected group is determined.

A determination is then at 306 made whether the density of the selected group of pixels is greater than or equal to a preselected threshold. The preselected threshold may be any suitable density percentage, as will be appreciated by those skilled in the art. According to one embodiment, a suitable density threshold is selected as 30%. In accordance with other embodiments of the subject application, the threshold density value is selected from among the range of 25% to 45% density. Upon a determination that the density of the selected group is below the preselected threshold, flow proceeds to 308, whereupon the group is designated as a zero (0) for a binary representation of the page being analyzed. When it is determined at 306 that the density of the selected group is equivalent to or exceeds the preselected threshold, operations proceed to 310, whereupon the group is designated as a one (1) for a binary representation of the page being analyzed. After either 308 or 310, flow proceeds to 312 for a determination whether another group of (x) pixels remains for analysis. When one or more additional pixel groups remain for processing, operations return to 302 for analysis in 302-312.

Figure 5:
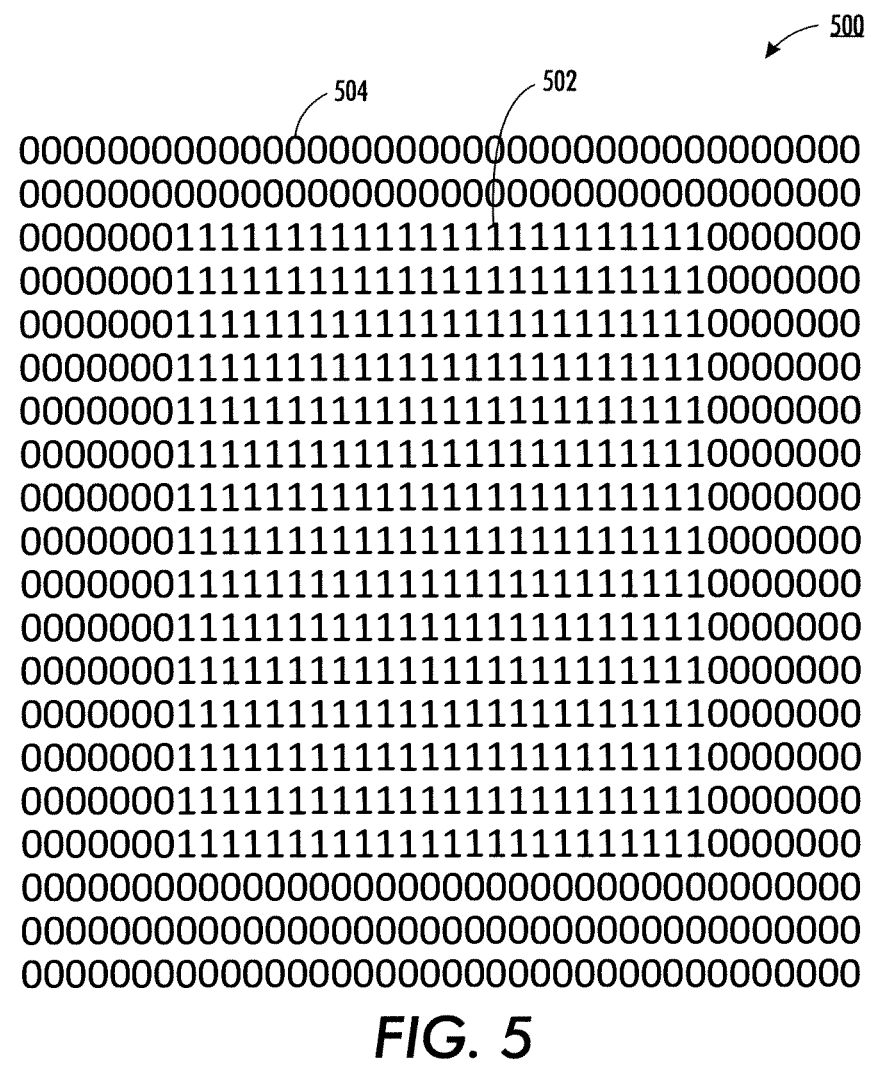
Figure 6:
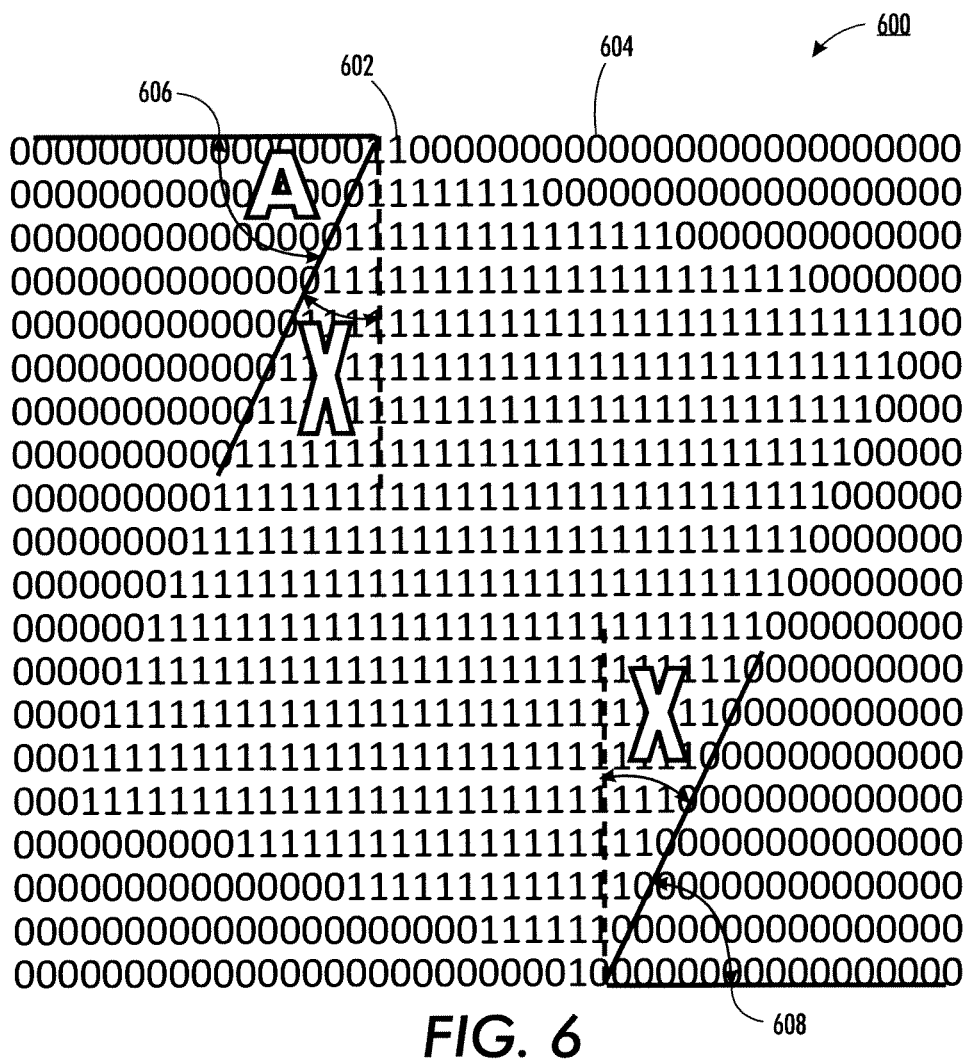
FIG. 6 illustrates a sample binary representation illustrating skew detection/correction in accordance with one embodiment of the subject application.

Upon a determination at 312 that no additional groups of pixels remain for processing for the current page, the methodology 300 of FIG. 3 proceeds to 314. At 314, a binary representation of the page is generated using the group designations determined above. FIG. 5 illustrates an example binary page 500 representation of input image data, wherein pixel groups having meeting the preselected threshold value are represented as ones (502) and pixel groups that fail to meet the threshold are represented as zeros (504). Similarly, FIG. 6 illustrates an example binary page 600 representation of input image data that is skewed, with pixel groups having meeting the preselected threshold value are represented as ones (602) and pixel groups that fail to meet the threshold are represented as zeros (604).

Returning to FIG. 3, after generation of the binary representation of the page, a determination is made at 316 whether the page is skewed. That is, whether the page is tilted, or otherwise off-center, as will be understood in the art. Upon a determination that no skew is detected, operations return to 204 of FIG. 2 for further processing. When a skew is detected, operations proceed to 318, whereupon a first angle (Angle A 606 of FIG. 6) is calculated corresponding to the upper left corner of the page. In accordance with one embodiment of the subject application, the Angle A 606 is used to determine a suitable correction angle, i.e., to render Angle A 606 ninety degrees (straight). At 320, a second angle (Angle B 608) is calculated. According to the example embodiment described herein, the Angle B 608 is used as a reference and to determine the direction of correction. As illustrated in FIG. 6, a line is drawn perpendicular from the edge of the paper and the angle between the perpendicular and the edge of the paper is designated by the ones (1's) is X 610.

It will be appreciated that in the event that Angle A 606 and Angle B 608 are acute, the image 602 is skewed to the right. Conversely, if the angles 606 and 608 are obtuse, the image is skewed to the left. In accordance with the image 602 displayed in FIG. 6, the equation A+X=90 will determine the value of X, or angle of skew, as the Angle A 606 is automatically calculated. The image 602 is then rotated counter-clockwise by X degrees, such that the resulting output will not have a skew. It will be appreciated that the same calculations and methodologies are applied when the skew is to the left (opposite the image 602 of FIG. 6). That is, the equation in such an event is A−X=90, and solving for X will provide the direction of the skew, and the clockwise rotation of the image of the numerical answer (X) will remove the skew. Correction data is then generated at 322 corresponding to the rotation of the page so as to render a straight image, i.e., Angle A 606 at 90 degrees and Angle B 608 at 90 degrees. The skew detection and correction data is then output to the processor 104 or other suitable component of the multifunction device 102 at 324, and operations return to 204 of FIG. 2, as discussed in greater detail below.

As previously mentioned, the skew detection of FIG. 3 and the contamination/banding detection of FIG. 4 are capable of being performed in series, concurrently, sequentially, or the like. Thus, at 204 of FIG. 2, contamination detection is performed in accordance with the example implementation of FIG. 4. It will be appreciated that while the methodology 400 of FIG. 4 is used herein for contamination and banding detection, the subject application is capable of adaptation to use other contamination detection methodologies, and the subject application is not limited herein.

At 402, a page of the input data is segmented, or divided, into an x by y grid of a preselected size, so as to generate a plurality of cells. For example, each grid may be comprised of a predetermined number of pixels, (e.g., x pixels by y pixels), by units of length (e.g., centimeters, inches, etc), and the like. At 404, the density of the content of a section (cell) is determined. A determination is then made at 406 whether the density determined at 404 for the particular cell is below a preselected threshold density value. In the event that the density of the selected cell is not below the threshold, operations proceed to 420, whereupon a determination is made whether another cell remains to be processed from the input page data, discussed in greater detail below. When it is determined at 406 that the density of the contents of the cell is below a threshold value, flow proceeds to 408, wherein that cell is designated, i.e., flagged, as contaminated.

Stated another way, a determination is made at 406 whether or not the density of the contents in the cell are below a preselected value. In accordance with one example embodiment of the subject application, the preselected threshold is set at 5%, such that any cells with content that is below that density percentage are flagged as contaminated at 408. It will be appreciated that while 5% density is mentioned herein, other values are equally capable of being employed in accordance with the methodology 400 of FIG. 4, depending upon the type of document being analyzed (photograph, text, spreadsheet, graphic, etc.), e.g. 10%, 15%, or the like.

Figure 7:
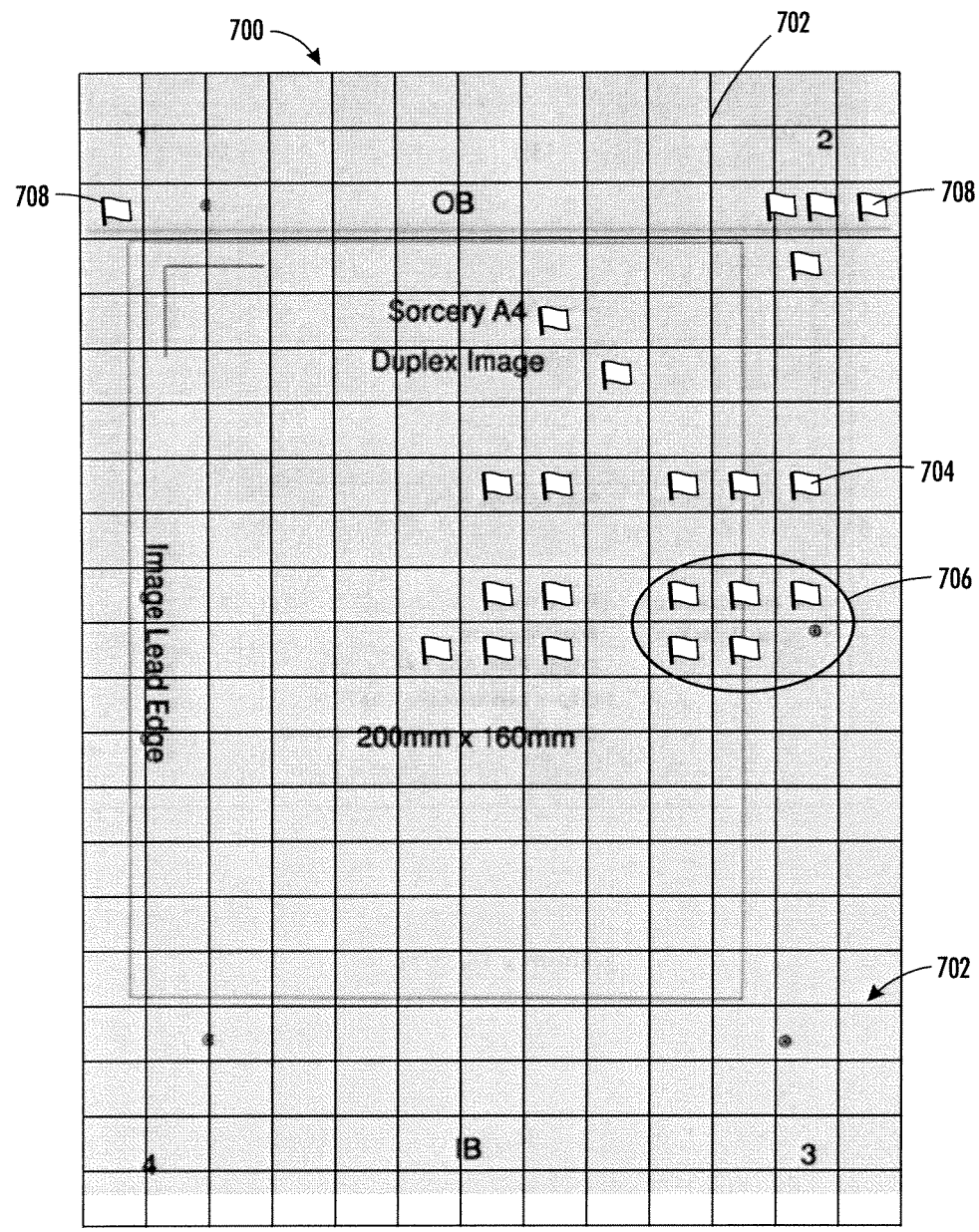
FIG. 7 illustrates a sample screen illustrating banding/contaminant detection in accordance with one embodiment of the subject application.

FIG. 7 illustrates a page 700 containing one or more contaminants in accordance with the methodology of FIG. 4. As shown in FIG. 7, the page 700 is divided into a grid of cells 702, which are then analyzed in accordance with 402-418, as set forth herein. The page 700 includes various contaminants, identified by flags 704. It will be appreciated that the illustration of FIG. 7 is intended to assist in visualizing the methodology of FIG. 4, and may not be visually rendered to the user during processing. According to another embodiment of the subject application, however, such a representation is made available for viewing by the associated user during processing of the page 700. Contaminants are grouped together for later ease of processing, as referenced herein at 706 and 708. It will be appreciated that such contaminants may be, for example and without limitation, smudges, fingerprints, blurs, dirt, banding, and the like.

Returning to FIG. 4, a determination is made at 410 whether the cell is located outside a preselected margin. In the event that the cell is located outside the preselected margin, e.g., the flagged cells 708 of FIG. 7 remain flagged as contaminants and identified as outside of the margins at step 412, whereupon operations proceed to 414, as discussed in greater detail below. It will be appreciated that banding typically stretches across the entire scanned area of page, i.e., across the margins of the page. According to one embodiment of the subject application, the areas on, above, and below the page are scanned from one edge of the page to the other and if the line runs across the page, reaching a flagged cell on the parallel side, the methodology herein identifies the probable existence of banding, and indicia is generated accordingly. In accordance with one embodiment of the subject application, the preselected margins may be adjusted as desired by the user, an administrator, or the like.

In the event that the cell is not located outside the preselected margin, operations proceed to 414, whereupon a determination is made whether any additional cells remain for processing. Upon a positive determination at 414, operations return to 402 as set forth above. Upon a determination at 414 that no additional cells remain for processing with respect to the input page, operations proceed to 416. At 416, flagged cells are grouped with surrounding flagged cells, illustrated as the grouping 706 and 708 of FIG. 7. It will be appreciated that the grouping of such contaminated cells enables the identification and correction of the contaminants by a user faster.

Operations then proceed to 418, whereupon the cell is subjected to optical character recognition ("OCR") in the native language of the multifunction device 102. A determination is then made at 420 whether a letter is detected. It will be appreciated that the detection of characters via OCR is performed using any suitable OCR processes known in the art. In the event that no letter is detected in the flagged cell, flow proceeds to 424 as discussed in greater detail below. When a letter is detected, operations progress to 422, whereupon a determination is made whether the detected letter is a mirror letter. That is, whether the letter is a mirror image of a proper letter, e.g., text from another side of the page was captured. In the event that the letter detected was not a mirror letter, the cell is unflagged (i.e., re-designated as not contaminated) at 426, and flow proceeds to 428. In the event that the detected letter is a mirror letter, the cell is left as flagged (contaminated), and the operations proceed to determine whether any groups contain allowed contaminants at 424.

The determination made at 424, according to one embodiment of the subject application corresponds to a determination whether any groups represent previously stored watermarks, embossments, designs, etc. In the event that one or more such groups are detected, operations proceed to 426, whereupon the one or more groups are unflagged, i.e., not identified as contaminants in accordance with the methods of FIG. 4. According to one embodiment of the subject application, data representative of allowable contaminants is stored in memory 106, additional data storage (not shown), or the like and accessible by the processor 104 or other suitable component associated with the multifunction device 102. It will be appreciated that the subject application enables a system administrator or user to enter different watermarks for storage and exception to the defect detection addressed herein. A collection of watermarks (such as images or non-native language characters), may be built up and checked during the flagging operations of FIG. 4, so that such watermarks may be ignored during defect detection and correction.

Following such unflagging at 426, or upon a determination at 424 that no allowed contaminants have been located, operations proceed to 428. At 428, indicia representative of contaminated cells (or groups of cells) is output for further processing in accordance with the method 200 of FIG. 2, as described herein. The methodology 400 of FIG. 4 then terminates, and processing continues from 204 of FIG. 2 for processing of the document associated with the page data.

Returning to 204, after analysis, a determination is made at 206 whether any defects in the page were detected. That is, a determination is made whether the methodologies 300 and 400 of FIGS. 3 and 4, respectively, returned indications that skew and/or contaminants were detected. In the event that no such defects were detected, operations proceed to 236, whereupon a determination is made if an additional page remains for processing in the document. If no further pages in the document remain for analysis, flow proceeds to 238, wherein the image data 114 corresponding to the original document 112 is processed as normal by the multifunction device 102 and operations with respect to FIG. 2 terminate. In the event that additional pages remain, flow returns to 202, as described more fully above.

Upon a determination at 206 that at least one defect in the current page was detected, a representation of the document, including any detected defects, is generated at 208. According to one embodiment of the subject application, the representation is generated via operations of the processor 104 and memory 106 of the multifunction device 102. It will be appreciated that the subject application is capable of implementation such that the representation is generated via a remote electronic device, e.g. a smart phone, tablet, personal computer, netbook, notebook, workstation, or other electronic device capable of generating the representation described herein.

At 210, the processor 104 or other associated component of the multifunction device 102 facilitates the generation of indicia on the representation so as to designate the detected defects. According to one embodiment of the subject application, the indicia includes, for example and without limitation, circled contaminates, flags, highlighting, or other graphical or textual indicators of the location/type of defect detected.

The processor 104 or other associated component of the multifunction device 102 then generates data representative of correction options so as to correct the detected defects at 212. In accordance with one embodiment of the subject application, the correction options include, for example and without limitation, image rotation, spell-check, rescanning, color matching, allowable defect (watermark/graphic/etc.), ignore defect, and the like. It will be appreciated that additional correction options may be included and the preceding list is representative of such types of correction options. In one example embodiment, the correction options are suitably generated so as to allow a user to view correction options via the display of the user interface 108 associated with the multifunction device 102.

Figure 8:
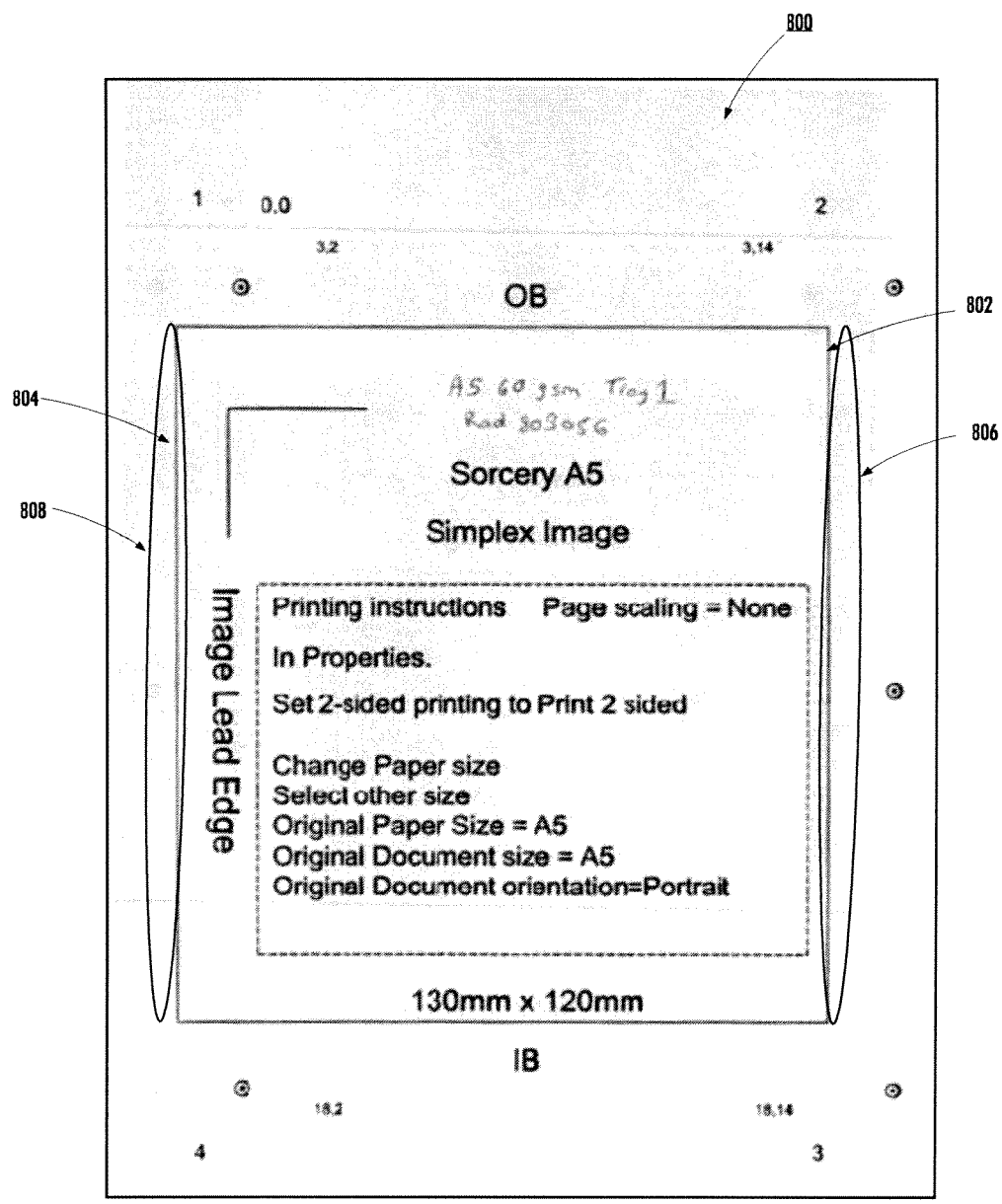
FIG. 8 illustrates an example representation illustrating skew and corresponding indicia in accordance with one embodiment of the subject application.

Referring now to FIG. 8, there is shown an example representation of a page 800 as displayed on, for example, a user interface 108 of the multifunction device 102, on a suitable computing device, smart phone, netbook, laptop, or the like. It will be appreciated that the representation 800 represents an electronic illustration of the page currently being processed, e.g., scanned image in such formats as RAW, JPEG, TIFF, GIF, PDF, or other image format. As shown on page 800, defects 802 and 804 illustrate a skew, i.e., off-center appearance of the page 800. In accordance with the methods described herein, indicia 806 and 808 are generated on the page 800 so as to draw attention to the defects 802 and 804.

Figure 9:
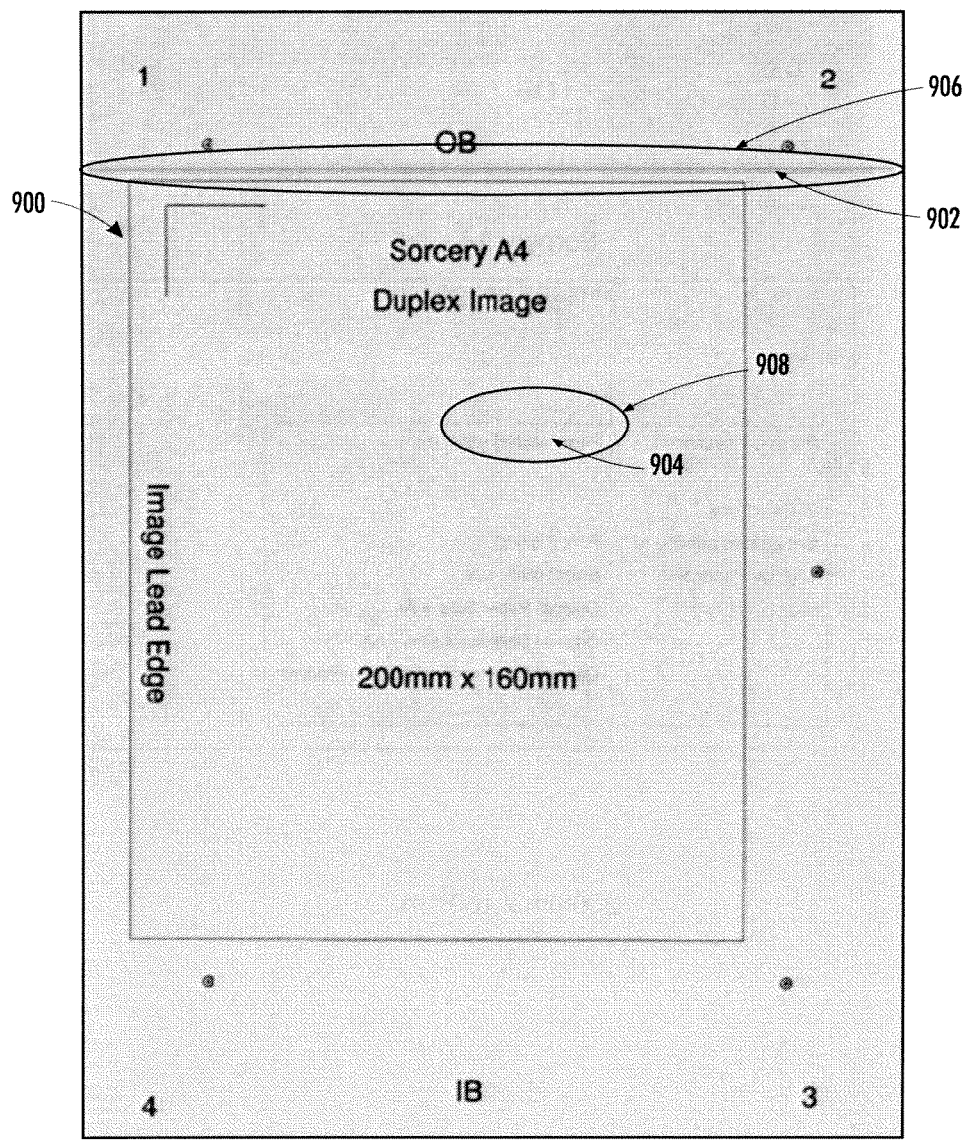
FIG. 9 illustrates an example representation illustrating banding/contaminants and corresponding indicia in accordance with one embodiment of the subject application.

Similar to FIG. 8, FIG. 9 depicts an example representation of a page 900 containing one or more defect 902 (banding) and 904 (contaminant). Indicia 906 and 908, respectively, are generated on the page 900 so as to indicate the position of the defect identified in accordance with the methods described herein. It will be appreciated that while described herein as separate pages, the subject application contemplates combination illustrations of FIGS. 8 and 9, e.g., a page may have contaminants and be skewed. In such circumstances (not shown), indicia corresponding to each defect, contaminant and skew, would be generated on the representation of the page containing both defects.

Returning now to FIG. 2, a determination is made whether image correction has been selected at 214. That is, the processor 104 or other suitable component associated with the multifunction device 102 determines whether input has been received indicative of a selection to correct one or more defects detected on the page. Upon a positive determination at 214, operations proceed to 216, whereupon selection data is received that corresponds to the indicia for correction selected by the associated user. Correction data is then received at 218 corresponding to the selected indicia. That is, the correction data is input by the user to correct the skew, cover up a defect, etc., or received in accordance with the methodologies of FIGS. 3 and 4, as discussed above.

The correction data is then applied to the input image data 114, i.e., the page being processed at 220. For example, the page may be rotated based on the skew determination and calculations of FIG. 3 so as to render the page in the proper orientation. In accordance with another example embodiment, the contaminant is removed by removal of the portion flagged by the methodology of FIG. 4. It will be appreciated that other types of image correction may be performed in accordance with the subject application, including, for example and without limitation color enhancement, saturation management, image sharpening, red-eye reduction, and the like.

A determination is then made at 222 whether all detected defects have been addressed for correction. In the event that all defects have been addressed, flow proceeds to 236, whereupon a determination is made whether any additional pages from the input image 114 of the original document 112 remain for processing. If no additional pages remain, the document processing operation originally selected for processing via the multifunction device 102 is performed, following which operations with respect to FIG. 2 terminate. In the event that at least one additional page remains for processing, operations return to 202 and the methodology 200 continues on the additional page as set forth above.

Upon a determination at 222 that additional defects remain in the page, operations with respect to FIG. 2 return to 214 for processing of the next defect in the input image data 114 of the page currently being processed. Upon a determination at 214 that image correction is not selected for the defect, operations proceed to 224, whereupon a determination is made whether re-generation of the image data 114 is selected. In accordance with such an example embodiment, the user is provided with the ability to initiate a re-scanning or regeneration operation for the page (or entire document 112) upon which the particular defect was detected. It will be appreciated that such an ability enables the removal of a contaminant or repositioning of the page without requiring electronic manipulation of the image data.

In the event that regeneration of image data 114 is selected, operations proceed to 226, whereupon the multifunction device 102 performs the rescanning of the page corresponding to the detected defect. A determination is then made at 222 whether any additional defects on the page are detected. That is, a determination is made whether all detected defects previously detected on the page have been addressed (corrected) based upon the regeneration of the input image 114. If a positive determination is made at 222, operations proceed to 236, as discussed above. If a negative determination is made at 222, operations return to 214, as explained in greater detail above.

Returning to 224, when it is determined that re-generation of the input image 114 of the page being processed is not selected, operations progress to 228. At 228, a determination is made whether to add the detected defect as an allowed defect. That is, a determination is made whether the defect is not a defect, e.g., a watermark, embossment, or other indicia on a hardcopy that is intended to be present, but lacks the density necessary to avoid detection as a contaminant. Upon a negative determination at 228, operations proceed to 234, whereupon the detected defect is ignored, i.e., allowed to remain on the page with no corrections made. Flow then proceeds to 222, as set forth in greater detail above.

Upon a positive determination at 228, selection data corresponding to the detected defect to be allowed is received at 230 via the user interface 108 associated with the multifunction device 102. It will be appreciated that such selection data is capable of originating from a remote device, as discussed above, and reference made herein to the user interface 108 associated with the multifunction device 102 is for purposes of example only.

In accordance with such an operation of the subject methodology 200, data representative of the allowed defect is stored at 232 in the memory 106, mass data storage component, network storage, or the like, associated with the multifunction device 102. It will be appreciated that such storage enables future operations to ignore such a defect or recognize the appearance of the contaminant as allowable and unflag the group accordingly, as discussed above with respect to FIG. 4. It will further be appreciated that such data includes, for example and without limitation sample documents, images, printer descriptions, and the like. It will be appreciated that an administrator, supervisor, user, or the like, may upload or designate such data as allowable in accordance with the embodiments described herein. Operations then progress from 232 to 222 for a determination of whether any additional defects remain to be addressed on the page being processed. A positive determination at 222 returns operations to 214, whereas a negative determination progresses operations to 236.

Figure 10:
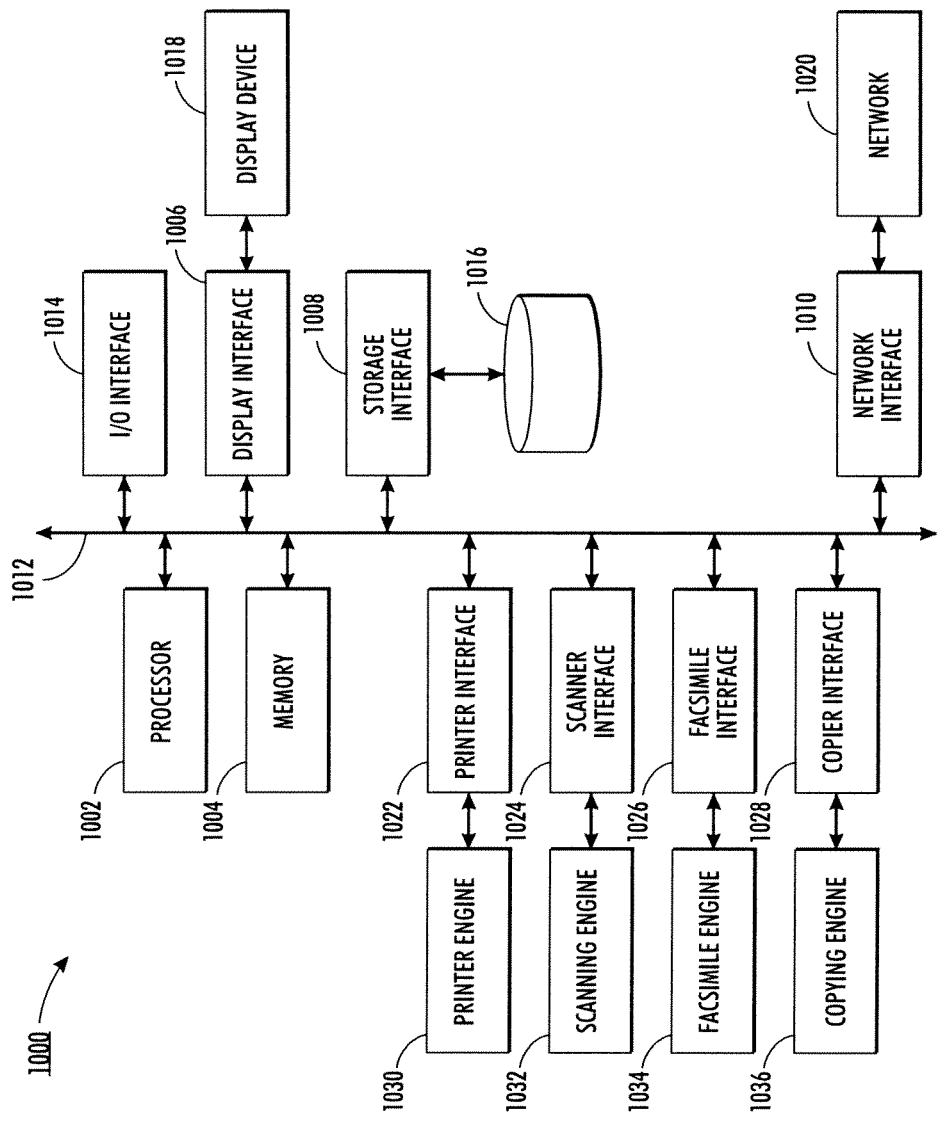
FIG. 10 illustrates a multifunction device system that is capable of implementation to facilitate defect detection and image correction in accordance with one embodiment of the subject application.

Turning now to FIG. 10, illustrated is a representative multifunction device 1000 (depicted in FIG. 1 as the multifunction device 102) that facilitates automatic defect detection and image correction in connection with one embodiment of the subject application. The multifunction device 1000 includes a processor unit 1002 which is advantageously placed in data communication with memory 1004, which may include, for example and without limitation, non-volatile read only memory, volatile read only memory, random access memory or a combination thereof, a display interface 1006, a storage interface 1008, and a network interface 1010. In one embodiment, interfacing with the foregoing modules is suitably accomplished via a bus 1012. The processor 1002 executes, and the memory 1004 stores computer-executable instructions for performing the various functions, methods, steps, techniques, and the like, described herein. The processor 1002 and memory 1004 may be integral to each other or remote but operably coupled to each other.

The memory 1004 suitably includes firmware, such as static data or fixed instructions, such as BIOS, system functions, configuration data, and other routines used for operation of the computer system 1000 via the processor 1002. The memory 1004 is further capable of providing a storage area for data and instructions associated with applications and data handling accomplished by the processor 1002.

The display interface 1006 receives data or instructions from other components on the bus 1012, which data is specific to generating a display to facilitate a user interface. The display interface 1006 suitably provides output to a display device 1018, suitably a video display such as a monitor, LCD, plasma, or any other suitable visual output device as will be appreciated by one of ordinary skill in the art.

As will be appreciated by those skilled in the art, the storage interface 1008 is configured to provide a mechanism for non-volatile, bulk or long term storage of data or instructions in the computer system 1000. The storage interface 1008 suitably uses a storage mechanism, such as storage 1016, suitably comprised of a disk, tape, CD, DVD, or other relatively higher capacity addressable or serial storage medium.

The network interface 1010 suitably comprises a network interface card, a wireless network interface, or the like. It will be appreciated that by one of ordinary skill in the art that a suitable network interface is comprised of both physical and protocol layers and is suitably any wired system, such as Ethernet, token ring, or any other wide area or local area network communication system, or wireless system, such as Wi-Fi, WiMax, or any other suitable wireless network system, as will be appreciated by one of ordinary skill in the art. In the illustration of FIG. 10, the network interface 1010 is connected to a physical network 1020, suitably comprised of a local area network, wide area network, or a combination thereof.

An input/output interface 1014 in data communication with the bus 1012 is suitably connected with input devices, such as a keyboard, mouse, pointing device, touch screen inputs, or the like. In addition, the input/output interface 1014 is further capable of data input and output to or from a peripheral interface, such as a USB, universal serial bus output, SCSI, IEEE 1394 output, or any other interface as may be appropriate for a selected application.

Also in data communication with the bus 1012 are interfaces to one or more document processing engines. As illustrated in FIG. 10, the multifunction device 1000 includes a printer interface 1022, a scanner interface 1024, a facsimile interface 1026, and a copier interface 1028. According to one embodiment of the subject application, the preceding interfaces 1022-1028 facilitate respective communication with a printer engine 1030, a scanning engine 1032, a facsimile engine 1034, and a copier engine 1036. It is to be appreciated that the multifunction device 1000 suitably accomplishes one or more document processing functions.

It will be appreciated that the print engine 1022 suitably enables the output of physical documents representing an electronic document communicated to the multifunction device 1000. It will also be appreciated that the scanning engine 1032 is suitably adapted to receive hard copy documents and generate electronic image data therefrom. According to certain embodiments of the subject application, the scanning engine 1032 is capable of generating such image data from tangible documents in a variety of forms, including, for example and without limitation, bitmapped data, vector data, page description language formatted data, and the like. It will further be appreciated that optical character recognition is also capable of being performed via functioning of the scanning engine 1032. The copier engine 1036 is suitably adapted to operate in conjunction with the scanning engine 1032 and the printer engine 1030 so as to generate tangible copies of input documents, as will be appreciated by those skilled in the art. In accordance with one embodiment, the facsimile engine 1034 communicates to or from external facsimile devices (not shown).

Figure 11:
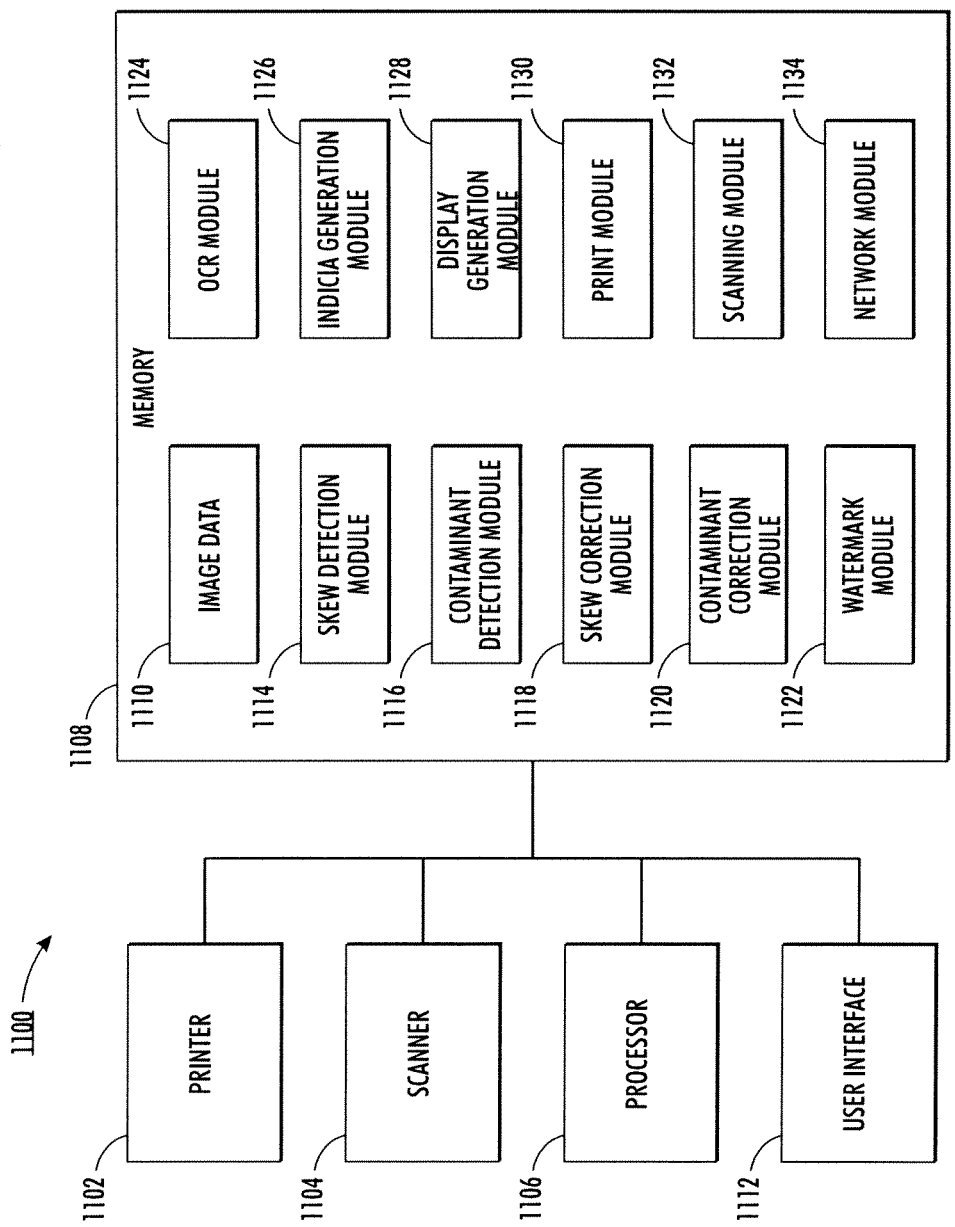
FIG. 11 illustrates a system that facilitates defect detection and image correction in accordance with one embodiment of the subject application.

FIG. 11 illustrates a system 1100 that facilitates automatic defect detection and correction in accordance with one embodiment of the subject application. The system comprises a print engine 1102 and a scanning engine 1104 that are coupled to a processor 1106 that executes, and a memory 1108 that stores computer-executable instructions for performing the various functions, methods, techniques, steps, and the like described herein. The processor 1106 and memory 1108 may be integral to each other or remote but operably coupled to each other. In another embodiment, the scanner 1104, the processor 1106, and memory 1108 are integral to the printer 1102. In another embodiment, the processor 1106 and memory 1108 reside in a single computing device that is operably coupled to the printer 1102 and the scanner 1104.

According to one embodiment of the subject application, the system 1100 comprises the processor 1106 that executes, and the memory 1108 that stores one or more computer-executable modules (e.g. programs, computer-executable instructions, etc.) for performing the various functions, methods, procedures, etc., described herein. Additionally, "module," as used herein, denotes application specific hardware, a set of computer-executable instructions, software code, program, routine, or other computer-executable means for performing the described function, or a suitable combination thereof, as will be understood by those of skill in the art. Furthermore, or alternatively, one or more of the functions described hereinafter with respect to the modules may be manually performed.

The memory 1108 may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

Upon receipt of image data 1110, which is capable of being received or generated by the processor 1106, via the scanner 1104 associated with the printer 1102, via a network connection from a suitable image source, or the like, the processor 1106 initiates a skew detection module 1114 to identify any defects in the orientation of the image data 1110, and a contaminant detection module 1116 to detect any contaminants or banding in the image data 1110. In accordance with one embodiment of the subject application, the skew detection module 1114 analyzes the received image data 1110 via a density coverage determination. That is, the module 1114 selects groups of pixels and determines the density of the area covered by the group. When the density is greater than or equal to a preselected threshold density value, the group is designated as a one. When the density is less than this preselected threshold, the group is designated as a zero. The ones and zeros of the image data 1110 are then combined by the skew detection module 1114 so as to generate a binary representation of the image data 1114 (see, e.g., FIGS. 5 and 6), and based upon the representation of the image data 1110, the skew detection module 1114 determines whether the image data 1110 is skewed. Data representative of the skew detected by the skew detection module 1114 is output to the skew correction module 1118 and the indicia generation module 1126, as discussed in greater detail below.

The processor 1106 then initiates a skew correction module 1118 so as to correct any skew detected by the skew detection module 1114. According to one embodiment of the subject application, the skew correction module 1118 calculates a first angle based upon the binary representation of the image data 1110 to determine the amount of correction necessary to render the image data 1110 properly oriented. The skew correction module 1118 also calculates a second angle so as to determine the proper direction in which to orient the image data 1110 to correct the detected skew. This correction data is then output by the skew correction module 1118 to indicia generation module 1126, as discussed below.

The contaminant detection module 1116, which may be executed by the processor 1106 prior to, contemporaneously with, or after execution of the skew detection module 1114, segments the image data 1110 into a grid of multiple cells. Each cell is then analyzed to determine the density associated therewith. The module 1116 then compares the determined density of the cells to a preselected threshold density value, with any cell below this threshold flagged (identified) as contaminated. According to one embodiment, the detection module 1116 analyzes the position of each cell, so as to flag any cell having a density below the threshold value and outside a preset margin for identification and correction. The contaminant detection module 1116 then groups contaminated cells together and outputs this information to a contaminant correction module 1120 and the indicia generation module 1126, as discussed below. A watermark module 1122 is then executed by the processor 1106 so as to determine whether any contaminants detected by the contaminant detection module 1116 are allowable, i.e., not defects. The cells or groups of cells are then analyzed by the optical character recognition module 1124 to determine whether the cell or group of cells contains one or more letters. In the event that a letter is detected by the module 1124, as executed by the processor 1106, a further analysis is performed to determine whether the letter is a mirror image, i.e., backwards letter. Any backwards lettered cells are maintained as contaminated, while any cells or groups of cells containing proper letters are designated as uncontaminated.

According to one embodiment, the contaminant correction module 1120 facilitates blending, blurring, modifications to the coloring, grayscale, saturation adjustments, red-eye correction, color enhancement, sharpening, and the like, so as to remove detected contaminants from the image data 110. Output from the contaminant correction module 1120 is communicated to the indicia generation module 1126, discussed below.

The indicia generation module 1126 then facilitates the generation of indicia on the image data 1110 via the display generation module 1128. That is, the display generation module 1128, in accordance with execution by the processor 1106, generates a representation of the image data 1110 via the user interface 1112. In accordance with output from the indicia generation module 1126, indicia representative of the defects detected by the skew detection module 1114 and the contaminant detection module 1116 are displayed on the image data 1110 on the user interface 1112. In addition, the indicia generation module 1126 may facilitate generation of correction information from the skew correction module 1118 and the contaminant correction module 1120 on the user interface 1112.

Depending upon the defects detected, a user, via the user interface 1112, is capable of selecting correction of the image data 1110, so as to output tangible corrected documents via the print module 1130 to the printer 1102, request new image data via the scanning module 1132 to the scanner 1104 (re-scanning), communicate corrected image data as desired via the network module 1134 (facsimile, email, network storage, etc.), and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for automated image defect correction comprising: with a processor of a multifunction device, receiving input image data representative of a scanned document; analyzing the received input image data so as to detect at least one defect on the scanned document; generating, in response to an output of the analyzing indicating at least one defect is detected, a representation of the scanned document represented by the received image data inclusive of the at least one detected defect on an associated display of the multifunction device; generating, with the processor of the multifunction device, at least one of a graphical icon or a textual indicator in proximity to the at least one detected defect on the displayed document representation of the scanned image data on the associated display of the multifunction device designating and identifying the at least one detected defect; displaying, on the user interface of the multifunction device, a plurality of correction options in association with the representation of the scanned document corresponding to the at least one detected defect; receiving correction data representative of a selection of a correction option corresponding to correction of the at least one detected defect via the display of the multifunction device; and correcting the at least one detected defect on the scanned document of the input image data in accordance with the received correction data; wherein the analyzing input image data further comprises: for each of a plurality of groups of pixels of the received image data: calculating a density associated with the group of pixels, comparing the calculated density of the group of pixels to a predetermined threshold density value, and designating a binary representation of the group of pixels in accordance with the comparison, wherein a group having a density greater than or equal to the threshold is designated as one and a group having a density below the threshold is designated as a zero; and generating, on the display of the multifunction device, a binary representation of the input image data in accordance with the designation of each of the plurality of groups of pixels, wherein each group of the plurality of groups having a density greater than or equal to the threshold is depicted as a one and each group of the plurality of groups having a density below the threshold is depicted as a zero in the binary representation.

2. The method of claim 1, further comprising:
calculating a first angle associated with the generated binary representation of the input image data corresponding to a correction angle; and
calculating a second angle associated with the generated binary representation of the input image data corresponding to a correction direction;
wherein the at least one detected defect corresponds to a skew of the input image data detected at least in part based on the first angle and the second angle.

3. The method of claim 2, wherein receiving correction data further comprises calculating skew correction data in accordance with the first angle and the second angle; and
wherein correcting the input image data further comprises generating corrected image data of the input image data in accordance with application of the skew correction data thereto.

4. The method of claim 1, wherein the analyzing input image data further comprises:
segmenting the input image data into a corresponding plurality of cells, each cell having a density content associated therewith;
designating each cell having a density content below a predetermined threshold value as contaminated; and
grouping one or more contaminated cells together based upon respective proximity thereto on the input image data,
wherein the at least one detected defect corresponds to a group designated as contaminated.

5. The method of claim 4, further comprising:
performing optical character recognition on each contaminated cell so as to identify at least one character contained therein;
re-designating each cell having at least one identifiable character contained therein as uncontaminated based at least in part upon the output of the optical character recognition;

determining whether the at least one identifiable character in each cell is a mirrored character; and maintaining the designation of each cell having at least one mirrored character as contaminated.

6. The method of claim 5, further comprising re-designating each contaminated cell in a group as uncontaminated in accordance with a determination that the group corresponds to an allowed contaminant responsive to at least one of a user designation of allowance or a correspondence between the group and at least one of a previously stored watermark, embossment, design or non-native language character.

7. The method of claim 6, wherein the correction data corresponds to an acceptance of the at least one detected defect, further comprising completing a preselected document processing operation in accordance with the received input image data.

8. The method of claim 6, wherein the correction data corresponds to a re-generation of the input image data, further comprising completing an image generation operation so as to generate new input image data of the document.

9. A system for automated image defect detection comprising memory which stores instructions for performing the method of claim 1 and a processor in communication with the memory for executing the instructions.

10. A computer program product comprising a non-transitory recording medium storing instructions, which when executed by a computer causes the computer to perform the method of claim 1.

11. An automated image defect correction system, comprising: a multifunction device, comprising: a processor; an associated user interface; and memory in communication with the processor, which stores instructions which are executed by the processor for: scanning a document to generate input image data representative of the scanned document, analyzing the document of the scanned input image data so as to detect at least one defect on the document, generating, in response to an output of the analysis indicating at least one defect is detected on the document, a representation on the associated user interface of the document of the scanned image data inclusive of the at least one detected defect, generating at least one of a graphical icon or a textual indicator in proximity to the at least one detected defect on the representation of the document of the scanned image data on the associated user interface identifying the at least one detected defect, generating, via the associated user interface, a plurality of correction options associated with the at least one detected defect, receiving, via the associated user interface, correction data representative of at least one selected correction option corresponding to a correction of the at least one detected defect, the at least one selected correction option selected from the group consisting of image rotation, spell check, rescanning the document, color matching, ignoring the at least one detected defect, identification of the at least one defect as an allowable defect, or removal of the at least one detected defect, correcting the at least one detected defect on the document of the scanned input image data in accordance with the selected correction option, and outputting, via the associated user interface, corrected image data representative of a corrected document; wherein the analyzing input image data further comprises: for each of a plurality of groups of pixels of the received image data: calculating a density associated with the group of pixels, comparing the calculated density of the group of pixels to a predetermined threshold density value, and designating a binary representation of the group of pixels in accordance with the comparison, wherein a group having a density greater than or equal to the threshold is designated as one and a group having a density below the threshold is designated as a zero; and generating, on the display of the multifunction device, a binary representation of the input image data in accordance with the designation of each of the plurality of groups of pixels, wherein each group of the plurality of groups having a density greater than or equal to the threshold is depicted as a one and each group of the plurality of groups having a density below the threshold is depicted as a zero in the binary representation.

12. The system of claim 11, wherein memory further stores instructions for:

for each of a plurality of groups of pixels of the received input image data:
calculating a density associated with the group of pixels,
comparing the calculated density of the group of pixels to a predetermined threshold density value, and
designating a binary representation of the group of pixels in accordance with the comparison, wherein a group having a density greater than or equal to the threshold is designated as one and a group having a density below the threshold is designated as a zero;

generating a binary representation of the input image data on the associated user interface of the multifunction device in accordance with the designation of each of the plurality of groups of pixels, wherein each group of the plurality of groups having a density greater than or equal to the threshold is depicted as a one and each group of the plurality of groups having a density below the threshold is depicted as a zero in the binary representation;

calculating a first angle associated with the generated binary representation of the input image data corresponding to a correction angle; and calculating a second angle associated with the generated binary representation of the input image data corresponding to a correction direction, wherein the at least one detected defect corresponds to a skew of the scanned document representative by the input image data detected at least in part based on the first angle and the second angle.

13. The system of claim 12, wherein the receiving correction data further comprises calculating skew correction data in accordance with the first angle and the second angle; and wherein correcting the input image data further comprises generating corrected image data of the input image data in accordance with application of the skew correction data thereto.

14. The system of claim 11, wherein memory further stores instructions for:

segmenting the input image data into a corresponding plurality of cells, each cell having a density content associated therewith;

designating each cell having a density content below a predetermined threshold value as contaminated;

performing optical character recognition on each contaminated cell so as to identify at least one character contained therein;

re-designating each cell having at least one identifiable character contained therein as uncontaminated based at least in part upon the output of the optical character recognition, wherein each cell having the at least one identifiable character corresponding to a mirrored character remains designated as contaminated;

grouping one or more contaminated cells together based upon respective proximity thereto on the input image data; and re-designating each contaminated cell in a group as uncontaminated in accordance with a determination that the group corresponds to an allowed contaminant, wherein the at least one detected defect corresponds to a group designated as contaminated.

15. The system of claim 14, wherein the correction data corresponds to an acceptance of the at least one detected defect, the memory further comprising instructions for completing a preselected document processing operation in accordance with the received input image data.

16. The system of claim 14, wherein the correction data corresponds to a re-generation of the input image data, the memory further comprising instructions for completing an image generation operation so as to generate new input image data of the document.

17. A computer-implemented method for automatically correcting image defects in scanned documents at a multifunction device, comprising: with a processor of the multifunction device, receiving image data corresponding to an electronic copy of a scanned document into a memory associated with the processor; analyzing the document of the received image data in the memory for at least one defect on the document; performing optical character recognition on the document so as to identify at least one character contained therein; detecting at least one defect in response to the optical character recognition indicative of a mirrored character; detecting at least one additional defect in the image data corresponding to at least one of a skew, a contamination, a banding, a lead edge, and an alignment defect; generating a notification indicative of the occurrence of each detected defect on a user interface of the multifunction device; generating, in response to an output of the analysis indicating at least one defect on the document, a representation of the received image data inclusive of each detected defect on the user interface of the multifunction device, the representation comprising an electronic illustration of a page of the document having the at least one detected defect; generating, with the processor, at least one of a graphical icon or a textual indicator corresponding to each detected defect on the user interface of the multifunction device, the at least one graphical icon or textual indicator identifying the occurrence and placement of each detected defect on the received image data representation; generating, via the associated user interface, a plurality of correction options associated with the at least one detected defect; receiving, via the user interface of the multifunction device, selection data of at least one correction option responsive to the notification corresponding to a selection of at least one of accepting at least one defect, correcting the at least one defect, and rescanning the document; receiving correction data corresponding to a correction of the at least one defect on the document of the input image data in accordance with the selection data; and generating corrected image data in accordance with received correction data; wherein the analyzing input image data further comprises: for each of a plurality of groups of pixels of the received image data: calculating a density associated with the group of pixels, comparing the calculated density of the group of pixels to a predetermined threshold density value, and designating a binary representation of the group of pixels in accordance with the comparison, wherein a group having a density greater than or equal to the threshold is designated as one and a group having a density below the threshold is designated as a zero; and generating, on the display of the multifunction device, a binary representation of the input image data in accordance with the designation of each of the plurality of groups of pixels, wherein each group of the plurality of groups having a density greater than or equal to the threshold is depicted as a one and each group of the plurality of groups having a density below the threshold is depicted as a zero in the binary representation.

18. The computer-implemented method for automatically correcting image defects in scanned documents of claim 17, wherein detecting the at least one defect further comprises:
for each of a plurality of groups of pixels of the received input image data:
calculating a density associated with the group of pixels,
comparing the calculated density of the group of pixels to a predetermined threshold density value, and
designating a binary representation of the group of pixels in accordance with the comparison, wherein a group having a density greater than or equal to the threshold is designated as one and a group having a density below the threshold is designated as a zero;
generating a binary representation of the input image data on the user interface of the multifunction device in accordance with the designation of each of the plurality of groups of pixels, wherein each group of the plurality of groups having a density greater than or equal to the threshold is depicted as a one and each group of the plurality of groups having a density below the threshold is depicted as a zero in the binary representation;
calculating a first angle associated with the generated binary representation of the input image data corresponding to a correction angle; and
calculating a second angle associated with the generated binary representation of the input image data corresponding to a correction direction,
wherein the at least one detected defect corresponds to a skew of the input image data detected at least in part based on the first angle and the second angle.

19. The method of claim 17, wherein detecting the at least one defect further comprises:
segmenting the input image data into a corresponding plurality of cells, each cell having a density content associated therewith;
designating each cell having a density content below a predetermined threshold value as contaminated;
performing optical character recognition on each contaminated cell so as to identify at least one character contained therein;
re-designating each cell having at least one identifiable character contained therein as uncontaminated based at least in part upon the output of the optical character recognition;
grouping one or more contaminated cells together based upon respective proximity thereto on the input image data; and
re-designating each contaminated cell in a group as uncontaminated in accordance with a determination that the group corresponds to an allowed contaminant, wherein the at least one detected defect corresponds to a group designated as contaminated.

* * * * *